Sept. 17, 1940.   H. C. BUFFINGTON   2,215,115
DOUBLE ACTING VALVE
Filed June 22, 1938    3 Sheets-Sheet 1
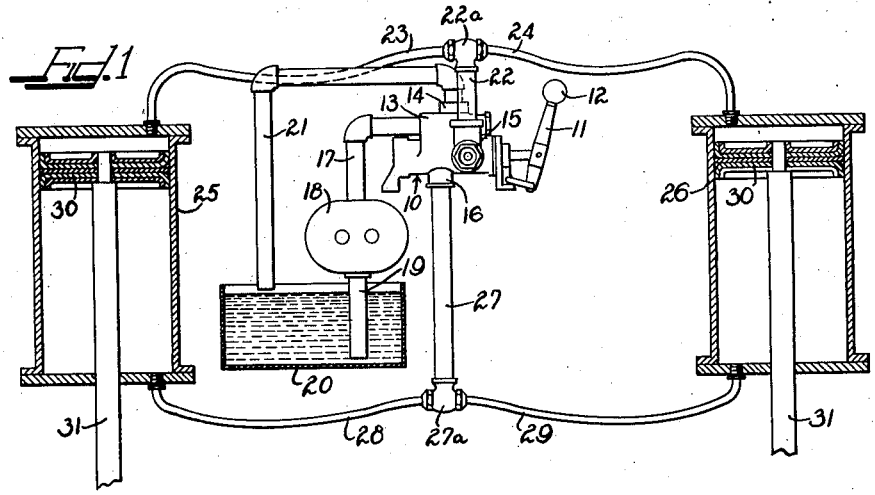
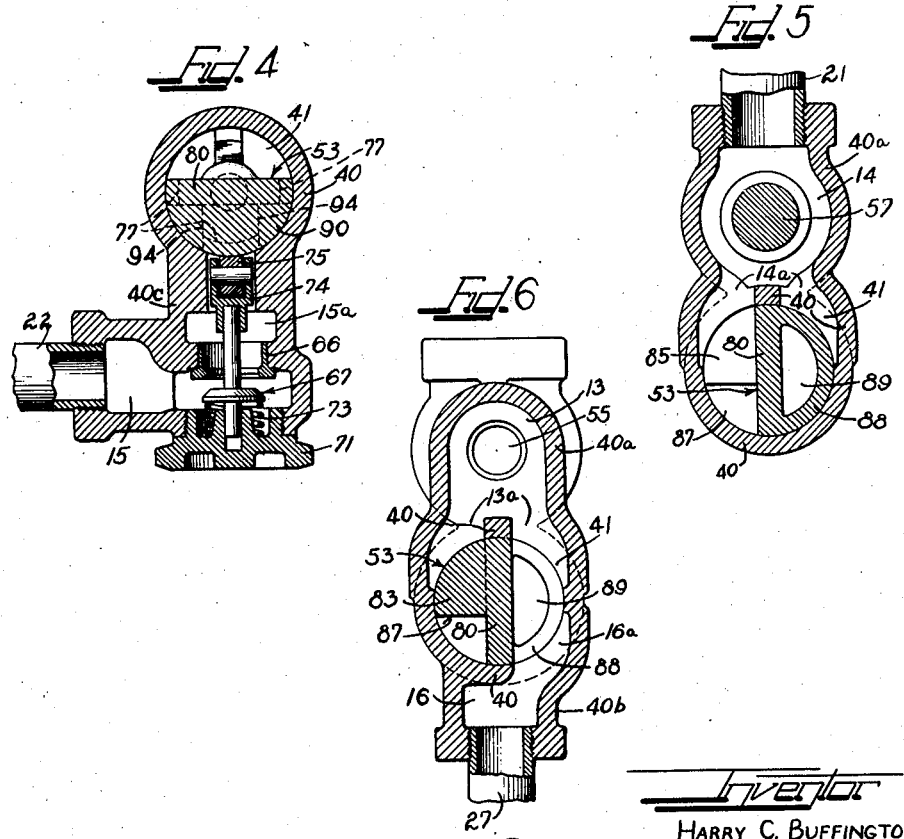
Inventor
HARRY C. BUFFINGTON Sept. 17, 1940.  H. C. BUFFINGTON  2,215,115
DOUBLE ACTING VALVE
Filed June 22, 1938  3 Sheets-Sheet 2
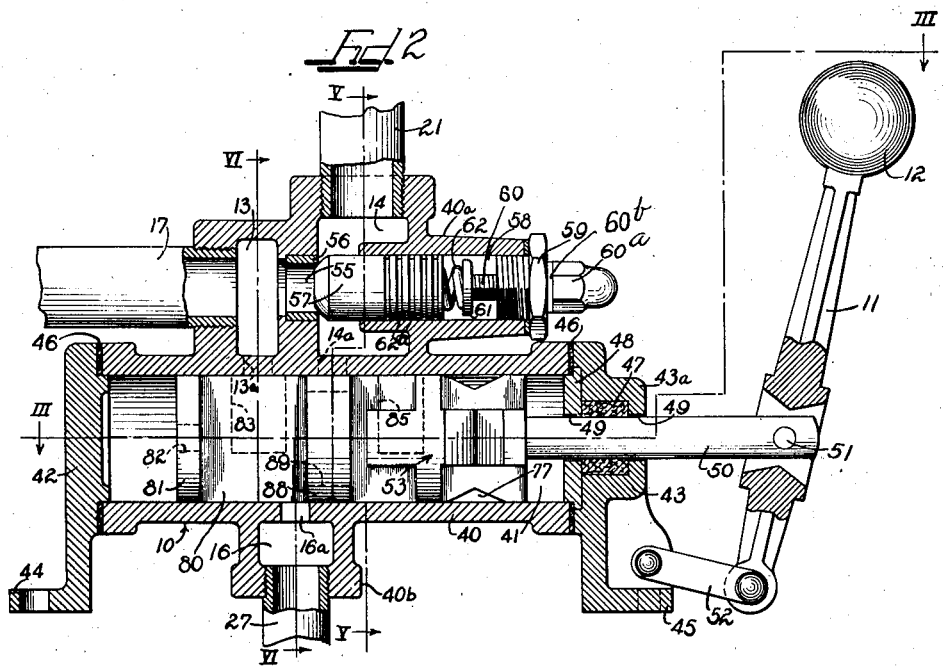
Inventor
HARRY C. BUFFINGTON

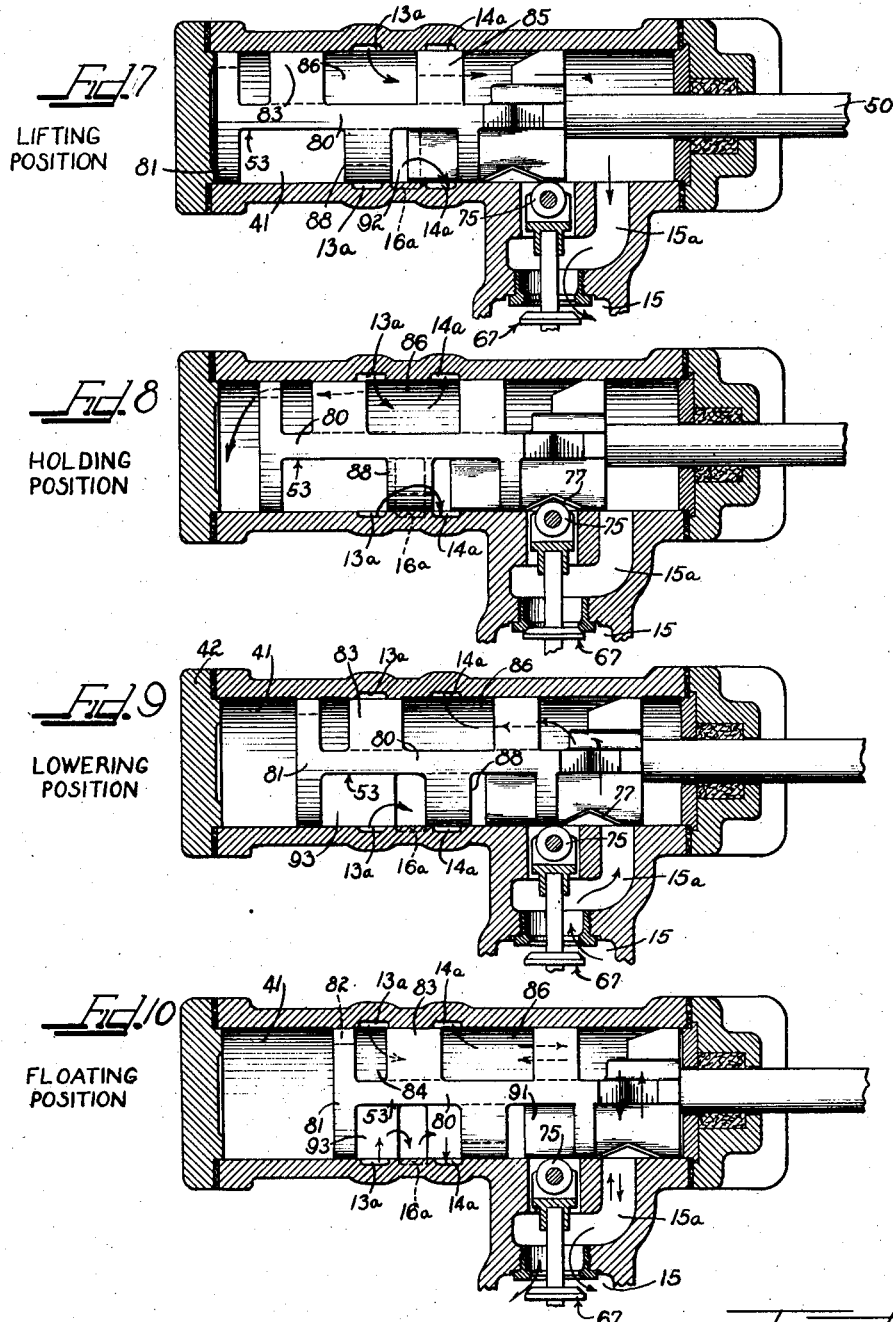

Patented Sept. 17, 1940

2,215,115

UNITED STATES PATENT OFFICE 2,215,115

DOUBLE ACTING VALVE

Harry C. Buffington, Springfield, Ill., assignor to Baker Manufacturing Co., Springfield, Ill., a corporation of Illinois Application June 22, 1938, Serial No. 215,095

13 Claims. (Cl. 277—7)

This invention relates to valves including sliding or reciprocal cores for operating unbalanced poppet valves.

More particularly, the invention relates to a valve mechanism including an unbalanced check valve and a reciprocal core for operating the check valve simultaneously with the directing of fluid under pressure to and from a pair of fluid pressure jacks, to effect four operating conditions for the jacks.

In tractor operated bulldozers, trailbuilders, snowplows and the like, the work implement blade is usually controlled by a pair of fluid pressure jacks. The jack cylinders are preferably supported by the push beams carrying the implement blade while the piston rods extending from the cylinders act against the tractor body or track frames of the tractor. When the piston rods are carried by the track frames, and when the pair of jacks are in fluid intercommunication, movement of the track frames in going over uneven ground does not affect the level of the work implement blade since fluid will flow back and forth between the cylinders.

Valves for controlling the flow of fluid under pressure to and from the cylinders should have four operating positions. In one position of the valves, the fluid under pressure should be supplied to the tops of the cylinders for raising the work implement blade. In the second operating position the fluid in the cylinders should be sealed to hold the work implement blade in a preset position. In this position of the valves, however, the fluid in the cylinders should be permitted to flow back and forth between the pair of cylinders so as not to affect the position of the implement blade due to movement of the track frames in going over uneven ground. In the third operating position, the valves should supply fluid under pressure to the bottoms of the jack cylinders for lowering the work implement blade. In the fourth operating position the valves should open all ports to permit free flow of fluid to and from the fluid reservoir and the cylinders thereupon permitting the work implement blade to "float" or operate against the ground solely by its own weight.

The valves of this invention are especially well adapted for raising, lowering, locking and "floating" the work implement blade of a bulldozer, snow-plow, or the like by manual reciprocation of a slidable valve core.

While the valves will be particularly hereinafter described in connection with the control of a hydraulic liquid for operating a pair of hydraulic jacks, it should be understood that these valves have wide usage in controlling flow of fluids under pressure.

It is, then, an object of this invention to provide a valve mechanism for controlling flow of fluid under pressure by a simple reciprocating movement.

Another object of the invention is to provide a valve having a slidable or reciprocable core together with an unbalanced check valve operated by the core.

Another object of this invention is to provide a valve mechanism for controlling flow of a liquid under pressure by a slidable core member having balanced end thrusts under all operating conditions to prevent undesired movements of the core.

Other and further objects of the invention will become apparent to those skilled in the art from the following detailed description of the annexed sheets of drawings which disclose a preferred embodiment of the invention.

On the drawings:

Figure 1 is a somewhat diagrammatic view, partly in vertical cross section, showing the valve mechanism of this invention operatively connected for controlling flow of a hydraulic liquid to and from a pair of hydraulic jacks.

Figure 2 is a vertical cross-sectional view, with parts in elevation, taken longitudinally through the valve mechanism of this invention.

Figure 3 is a horizontal cross-sectional view, with parts in elevation, taken along the line III—III of Figure 2.

Figure 4 is a vertical cross-sectional view, with parts shown in elevation, taken along the line IV—IV of Figure 3.

Figure 5 is a vertical cross-sectional view, with a part shown in elevation, taken along the line V—V of Figure 2.

Figure 6 is a vertical cross-sectional view, with parts shown in elevation, taken along the line VI—VI of Figure 2.

Figures 7 to 10 inclusive are horizontal cross-sectional views, with parts shown in elevation, of the valve mechanism illustrating the four operating positions of the valve.

As shown on the drawings:

In Figure 1 the reference numeral 10 designates generally a valve according to this invention having an operating lever 11 and handle 12 on the end of the lever. The valve 10 is provided with an inlet chamber 13, a return chamber 14, and operating chambers 15 and 16.

The inlet chamber 13 receives the end of a pipe line 17. The pipe line 17 is connected to the discharge side of a liquid pump 18. The inlet side of the pump 18 receives a pipe 19 extending into the bottom of an oil tank 20.

The return chamber 14 receives the end of a pipe line 21 communicating with the top of the oil tank 20 for returning oil to the tank.

The operating chamber 15 receives the end of a pipe 22. The pipe 22 has a T coupling 22a on the other end thereof joined with flexible hoses or tubes 23 and 24. The ends of the tubes 23 and 24 respectively enter the tops of hydraulic cylinders 25 and 26.

The operating chamber 16 of the valve 10 receives the end of a pipe 27. The other end of the pipe 27 has a T coupling 27a thereon communicating with flexible hoses or tubes 28 and 29. The hoses 28 and 29 respectively enter the bottoms of the hydraulic jack cylinders 25 and 26.

The jack cylinders 25 and 26 each have a piston 30 therein and a piston rod 31 secured to the piston and extending through the bottom heads of the cylinders.

The cylinders 25 and 26 are preferably carried by the push beams of a bulldozer, snowplow or the like while the piston rods 31 are preferably carried by the track frames or tractor body portion of the bulldozer or snowplow.

A manipulation of the lever 11 of the valve 10 controls flow of fluid from the various chambers of the valve to supply oil from the tank 20 either to the tops of the cylinders 25 and 26 or to the bottoms of the cylinders 25 and 26. The valve also can lock the oil in the cylinders 25 and 26 so that the same cannot return through the valve to the oil tank 20. In another operating position the valve permits free flow of oil between the cylinders and the oil tank.

As best shown in Figures 2 and 3, the valve 10 comprises a casing 40 defining a cylindrical control chamber 41. The ends of the chamber 41 are closed by end caps 42 and 43 respectively. The end caps 42 and 43 have feet 44 and 45 thereon for bolting the valve to the tractor or other supporting structure. Gaskets such as 46 can be interposed between the end caps 42 and 43 and the ends of the casing 40.

The end cap 43 has an annular portion 43a extending outwardly therefrom to define a chamber 47. The packing 47 is held in the chamber by a packing ring 48. The packing ring and end cap 43 have aligned openings 49 therethrough for receiving in slidable relation thereto an operating rod 50. The rod 50 is pivoted to the operating lever 11 as at 51. The end of the lever 11 is pivotally connected to the end cap 43 through a link 52. It is thus evident that a swinging of the lever 11 toward and away from the casing 40 will move the rod 50 into and out of the casing.

The inner end of the rod 50 is secured to a cylindrical core 53 slidably mounted in the control chamber 41.

The casing 40 has an integral housing structure 40a on the top thereof, a second integral housing structure 40b on the bottom thereof and a third integral housing structure 40c on the side thereof.

The housing structure 40a defines the inlet chamber 13 and the return chamber 14. The housing structure 40b defines the operating chamber 16. The housing structure 40c defines the operating chamber 15.

The inlet chamber 13 communicates through a passageway 55 with the return chamber 14 as best shown in Figure 2. A valve seat 56 is provided in this passageway 55 and receives a slidable relief valve 57 thereon. The relief valve 57 is slidably mounted in a cylindrical compartment 58 of the housing structure 40a. A boss plug 59 is threaded into the cylindrical compartment 58. A tension adjusting headless screw 60 is threaded thru the boss 59. A cap 60a is threaded on the projecting end of the screw 60 and a gasket 60b is compressed between the cap and boss plug 59 to seal against pressure leaks from the compartment 58. A collar 61 is provided on the inner end of the screw 60 for abutting a coiled spring 62 thrusting against the valve 57 to urge the valve against the valve seat 56. Oil grooves 62a are provided around the periphery of the valve 57 for sealing the outer end of the compartment 58 from the chamber 14.

The compression of the spring 62 is adjusted by the screw 60 to hold the valve 57 against the seat 56 for retaining a predetermined pressure in the chamber 13. When the pressure in the inlet chamber 13 exceeds this predetermined amount, the valve 57 will be forced open to return the fluid into the return chamber 14 and back to the oil tank 20.

Passages 13a, 14a, 15a and 16a respectively connect the chambers 13, 14, 15 and 16 with the control chamber 41 at various points along the length of the control chamber.

The housing portion 40c has a partition 65 between the chamber 15 and the passage 15a. A valve seat 66 is threaded through the partition 65, as best shown in Figure 3.

A poppet valve 67 has a stem portion 68 extending through the valve seat 66, a head portion 69 adapted to seat on the valve seat 66 for separating the chamber 15 from the passage 15a and a second stem portion 70 extending outwardly from the head 69.

The chamber 15 is closed by a plug 71 threaded into the housing portion 40c. The plug 71 has a well 72 in the center portion thereof for slidably receiving therein the valve stem portion 70. A coiled spring 73 is held under compression between the plug 71 and the valve head 69 for urging the valve head against the valve seat 66.

The valve stem 68 of the valve 67 receives a square or rectangular roller mounting 74 on the end thereof. The mounting 74 rotatably supports a roller 75 adapted to ride on the surface of the slidable core 53. The mounting 74 and roller 75 are disposed in a square or rectangular compartment 76 broached out from a cylinder formed in the housing 40c to prevent rotation of the mounting.

An annular V-groove 77 is formed around the core 53 to define cam surfaces 78 and 79 to act against the roller 75 for opening and closing the valve 67 as the core 53 is moved in the control chamber 41.

As best shown in Figures 3, 5 and 6, the slidable core member 53 has an axial vertical wall 80 abutting the top and bottom of the casing 40 and extending the full length of the core with the exception of the grooved portion 77 cut around the core.

The inner end of the core 53 has a solid disc portion 81 sliding against the entire circumference of the chamber 41 except for a cut away portion 82 in the periphery of the disc. This cut away portion permits oil to bleed past the disc into the portion of the chamber 41 between the disc and the cap 42. Such bleeding of the oil prevents an end thrust against the core that would otherwise effect an undesired sliding movement out of the selected position for the core.

A solid masking portion 83 extends from the vertical wall 80 of the core for closing that part of the mouth of the passage 13a on the same side of the wall 80 as the masking portion, as shown in Figure 6. This masking portion 83 is quadrant shaped, as shown in Figure 6, to provide a passageway 87 therebeneath.

The masking portion 83 is in spaced longitudinal relation from the disc 81 to define therebetween a compartment 84, as best shown in Figure 3.

A second masking portion 85 extends from the same side of the vertical wall 80 as the masking portion 83 and is in spaced longitudinal relation from the portion 83 to define a compartment 86 therebetween, as shown in Figure 3. The masking portion 85 is also quadrant shaped to close off that part of the mouth of the passage 14a on the same side of the wall 80 as the masking portion 83 and to define a passageway therebeneath similar to the passageway 87.

Oil entering the compartment 86 can freely flow through the passageways 87 under the masking portions 83 and 85 and around the groove 77 of the core into the passage 15a. The oil can likewise bleed through the groove 82 in the disc 81 to prevent an end thrust on the core 53.

A hollow masking portion 88 (Figures 3, 5 and 6) of semicylindrical shape extends from the other side of the vertical wall 80 at a point intermediate the masking portions 83 and 85. The portion 88 has a passageway 89 therethrough.

This portion 88 is adapted to close the mouth of the passage 16a and those portions of the passages 13a and 14a opening on this side of the wall 80, as best shown in Figures 5 and 6.

As shown in Figures 3 and 4, a fourth masking portion 90 of semicircular shape extends from the same side of the wall 80 as the portion 88 but is in spaced longitudinal relation from the portion 88.

A leg 91 extends from the portion 90 into spaced relation from the portion 88. The masking portions 88 and 90 therefore define a compartment 92 therebetween containing the leg 91. The edge of the leg 91 serves as a surface against which the roller 75 of the valve 67 can operate.

Since the masking portion 88 is in spaced longitudinal relation from the rear disc 81, another compartment 93 is formed between this masking portion and disc and is connected with the compartment 92 through the passageway 89.

As shown in Figure 4, passages 94 are formed in front of the masking portion 90 to cooperate with the groove 77 around the core for permitting flow to and from the passage 15a.

*Operation of the valve mechanism*

The operation of the valves of this invention will be best understood from a reference to Figures 7 to 10 inclusive, which show the various operating positions of the valve.

In Figure 7, the core 53 is moved to its innermost position in the operating chamber 41. In this position half of the inlet passage 13a communicates with the compartment 86 between the masking portions 83 and 85. That portion of the passageway 13a on the other side of the wall 80 is closed by the masking portion 88.

The masking portion 85 closes that portion of the return passage 14a opening on the same side of the wall 80 as the open portion of the passage 13a. The other half of the return passage 14a on the other side of the wall 80 communicates with the compartment 92.

The mouth of the operating passage 16a communicates with the compartment 92 and oil can flow from this passage into the return passage 14a.

The roller 75 on the valve 67 is contacting the peripheral surface of the core 53 to hold the valve open. The passage 15a thereby communicates with the operating chamber 15.

With the core in the position shown in Figure 7, therefore, oil from the inlet passage 13a flows into the compartment 86 and under the masking portion 85 into the operating chamber 15 from which it is fed to the upper ends of the hydraulic jack cylinder 25 and 26 through the pipe 22 and tubes 23 and 24, as shown in Figure 1. This causes the jack cylinders to raise, thereby lifting the work implement blade. Oil in the jack cylinders beneath the pistons 30 flows through the tubes 28 and 29 and pipe 27 into the operating chamber 16. The passageway 16a from the operating chamber is open so that the oil flows through the compartment 92 in the control chamber 41 and from the compartment 92 into the passageway 14a for return to the tank 20.

In the position of the valve shown in Figure 7, therefore, the core directs fluid from the pump to the operating chamber 15 from which it is sent to the upper ends of the jack cylinders. Oil from the lower ends of the jack cylinders is returned to the tank through the operating chamber 16. Oil from the pump cannot flow back to the tank because that portion of the passageway 14a on the same side of the wall 80 as the open passage 13a is closed by the masking portion 85. Likewise, oil from the pump cannot flow into the lower ends of the cylinders since that portion of the passage 13a on the other side of the wall 80 is closed.

In the position shown in Figure 8, oil is locked in the jack cylinders and can only flow between the cylinders on the same sides of the pistons. Thus the passages 13a and 14a are in communication through the compartment 86 and through the hollow masking portion 88.

The roller 75 on the valve 67 is disposed in the groove 77 of the core 53 so that the passage 15a is separated from the operating compartment 15 by the closed valve 67. This prevents flow of oil from the tops of the jack cylinders into the valve.

The operating chamber 16 communicating with the lower ends of the jack cylinders has its passageway 16a closed by the masking portion 88 of the core 53, thereby sealing the oil in the lower ends of the jack cylinders.

Oil from the pump 18 is merely recirculated back to the tank 20 through the passages 13a and 14a which are in full communication with each other. The implement blade is thus held at a selected position and cannot move from this position, while at the same time the pump is not subjected to a load.

The next position of the valve is shown in Figure 9, wherein the core 53 is moved a step outward from the position shown in Figure 8. In this position the inlet passage 13a on one side of the wall 80 of the core is closed by the masking portion 83. However, the other half of the inlet passage 13a on the other side of the wall 80 is in communication with the compartment 93. The compartment 93 also registers with the operating passageway 16a. That portion of the return passageway 14a on the same side of the wall 80 as the operating passageway 16a is closed by the masking portion 88. However, the portion of the return passageway 14a on the other side of the wall 80 is in communication with the compartment 86.

The roller 75 on the valve 67 is in contact with the peripheral surface of the core 53 to hold the valve open and join the operating compartment 15 with its passage 15a.

In the position shown in Figure 9, therefore, oil from the pump 88 passes through half of the passage 13a into the compartment 93 from which it is directed into the operating passageway 16a for flowing into the operating chamber 16 and through the pipe 27 and tubes 28 and 29 into the bottom ends of the jack cylinders 25 and 26. This will cause a lowering of the jack cylinders to move the work implement blade downward. Since oil is disposed above the pistons in the tops of the jack cylinders, this oil must be removed to permit the downward movement of the cylinders. The oil can flow freely out of the tops of the cylinders through the tubes 23 and 24 into the pipe line 22. From the pipe line 22, the oil flows through the operating chamber 15, the passageway 15a, the groove 77 of the core, the passageway beneath the masking chamber 85 and into the compartment 86. From the compartment 86 the oil can freely flow back to the tank 20 through the open half of the return passage 14a.

In the position shown in Figure 9, therefore, oil is only fed to the bottoms of the jack cylinders while the oil in the tops of the jack cylinders is allowed to return to the tank 20.

A movement of the core 53 to its outermost position in the operating compartment 41 as shown in Figure 10, permits the oil to flow freely through the valve and to and from the cylinders and oil tank. In this position of the valve, the work implement blade is allowed to "float" along the ground level due to its own weight.

As shown in Figure 10 the inlet passage 13a on one side of the wall 80 communicates with the compartment 84. The inlet passage 13a on the other side of the wall 80 communicates with the compartment 93. Oil from the compartment 84 can flow into the compartment 86 under the masking portion 83 as best shown in Figure 6. The oil from the inlet passage 13a on both sides of the wall 80 is therefore in communication with the return passage 14a on both sides of the wall.

The operating passage 16a likewise communicates with the compartment 93 and oil can freely flow through this passage.

The leg portion 91 of the core abuts the roller 75 to open the valve 67 and place the operating chamber 15 in communication with its passageway 15a.

With all of the passageways open, it is obvious that oil can flow into and out of both ends of the jack cylinders through the valve while oil from the pump can return to the tank through the valve.

In all operating positions of the valve, the space in the control compartment 41 between the disc 81 and the end cap 42, receives or discharges oil through the bleeder passage 82 into the compartment 84. This compartment 84 communicates beneath the masking member 83 as shown in Figure 6 with the compartment 86. In this manner no end thrust is placed on the core as the same is moved between its various operating positions.

In any position of the valve, if the pressure in the inlet chamber 13 exceeds a predetermined maximum, the relief valve 57 will open to return the oil to the tank 20.

From the above descriptions it should be understood that the valves of this invention are adapted to apply down pressure and up pressure to hydraulic jacks for raising and lowering work implement blades on bulldozers, snowplows and the like. These valves are also adapted to lock the implement blade in a desired position and to permit the implement blade to "float."

The valves operate by a simple sliding action of a core member which, in its sliding movement, controls the operation of a check valve. The slidable core can be greatly modified from the detailed construction described hereinabove. For example, a rearrangement of the ports in the valve casing will permit the use of a core having grooves therein to connect the ports and solid or ungrooved portions to mask the ports. The check valve prevents return of liquid from the jack cylinders so as to lock the work implement blade in a desired position and when closed thereby prevents any increased liquid pressure in the jack cylinders from effecting an operation of the relief valve. This relief valve is operative only to relieve increased oil pressure from the pump.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A valve comprising a casing, partitions dividing the casing into an inlet chamber, a return chamber, two operating chambers and a control chamber, said casing having passages connecting each of the first mentioned chambers with the control chamber, a valve seat between one of said operating chambers and its passage to the control chamber, an unbalanced valve normally seated on the valve seat to separate said passage from the operating chamber, a core reciprocally mounted in said control chamber having cut away portions establishing communication through the control chamber between various of said passages, said core also having solid portions for closing various of said passages, means carried by said unbalanced valve riding on said core and said core having a cam surface adapted to contact said means for opening and closing the unbalanced valve at selected positions of the core.

2. A valve mechanism comprising a hollow casing, a core slidable in said casing, said core having an axial wall dividing the casing, a plurality of masking portions extending from both sides of said wall in spaced relation to each other, a V-shaped groove in one end of said core, an unbalanced poppet valve in said housing in spaced relation from the control chamber, a roller carried by the valve adapted to ride in and out of the V-shaped groove of the core to open and close the valve, said casing having a plurality of ports adapted to be closed by said masking portions and placed in communication with each other through the spaces between the masking portions.

3. A valve mechanism comprising a casing defining an elongated cylindrical control chamber, an inlet chamber, a return chamber and a pair of operating chambers, passages connecting the inlet, return and operating chambers with the control chamber at spaced areas along the length of the control chamber, an unbalanced poppet valve normally separating one of said operating chambers from its passage, a core slidably mounted in the control chamber to connect various of said passages with each other through the control chamber, and means carried by the poppet valve riding on said core for opening the valve at selected positions of the core.

4. A valve mechanism comprising a casing defining an elongated cylindrical control chamber, an inlet chamber, a return chamber and a pair of operating chambers, passages connecting the inlet, return and operating chambers with the control chamber at spaced areas along the length of the control chamber, a dividing wall slidable longitudinally in the control chamber, said passages from the inlet and return chambers opening on both sides of said wall, spaced masking portions extending from one side of said wall to close those portions of the passages on that side of the wall, and a single hollow masking portion extending from the other side of the wall between said first mentioned masking portions to close the other portions of the passages whereby a sliding of the wall will control flow of fluid between the passages.

5. In a valve mechanism comprising a casing defining a cylindrical control chamber, an operating chamber, an inlet chamber and a return chamber, a dividing wall slidable longitudinally in said control chamber, passages joining the inlet and return chambers with the control chamber on both sides of the wall at spaced areas along the control chamber, a passage joining said operating chamber with said control chamber on one side only of said wall between the first mentioned passages, a hollow semicylindrical masking portion extending from one side of said wall to selectively close the passages and to permit fluid flow therethrough between the inlet and return passages while closing the operating chamber passage, and spaced solid quarter circular masking portions extending from the other side of said wall to selectively close the inlet and return passages on said side of the wall alternately with a closing of the operating passage whereby flow of fluid through the passages is controlled by a sliding of the wall.

6. A valve mechanism comprising a housing defining a central elongated control chamber, said housing having an integral portion thereof defining an inlet chamber and a separate return chamber, passages connecting the inlet and return chambers with the control chamber, a separate passage in said integral housing portion joining the inlet and return chambers, a relief valve normally closing said passage, said housing having a second integral housing portion defining an operating chamber, a passage connecting the operating chamber with the control chamber, an unbalanced valve separating the operating chamber from its passage, a core slidable in the control chamber to direct fluid flow between the passages and said core having cam surfaces to operate said unbalanced valve.

7. A valve mechanism comprising a casing defining a control chamber, an inlet chamber, a return chamber and a pair of operating chambers, said casing having ports joining the inlet, return and operating chambers with the control chamber at spaced areas therealong, an unbalanced valve in the outlet side of one of said operating chambers to seal the chamber from its port, a core reciprocally mounted in said control chamber and having a cam surface to operate the unbalanced valve, masking portions at spaced intervals along said core to selectively close said ports, said masking portions defining compartments therebetween in the control chamber to operatively join said ports and determine the effective length of the control chamber, and means outside of said casing to reciprocate the core for selectively directing fluid to and from one or both of the operating chambers.

8. In a fluid pressure jack assembly having a jack cylinder, a piston in the cylinder in slidable relation thereto, a pair of conduits each communicating with an opposite end of the cylinder, a source of fluid for operating the piston, a pump for propelling said fluid under pressure through the conduits to the cylinder, and a tube for returning fluid from the cylinder to said source, the improvement which comprises a valve mechanism for directing liquid flow to and from the cylinder, said mechanism including a casing defining a pair of operating chambers each in communication with one of said conduits and an elongated control chamber in communication at spaced areas along the length thereof with said operating chambers, an unbalanced valve in one of said operating chambers separating said chamber from the control chamber, and a core movable in said control chamber to direct fluid flow to and from the ends of the jack cylinders and to actuate said unbalanced valve for permitting such flow.

9. A valve mechanism comprising a casing defining an elongated cylindrical control chamber, an inlet chamber, a return chamber, and an operating chamber, passages connecting said inlet, return and operating chambers with said control chamber at spaced areas along the length of the control chamber, an unbalanced poppet valve normally separating said operating chamber from its passage, a core slidably mounted in the control chamber to connect various of said passages with each other through the control chamber, and means carried by the poppet valve riding on said core for opening the valve at selected positions of the core.

10. Valve mechanism comprising a casing defining a main control chamber, an inlet chamber, a return chamber, and an operating chamber, said casing having passageways joining the inlet, return, and operating chambers with the control chamber at spaced apart points therein, an unbalanced valve normally separating the operating chamber from its passageway, a core slidably mounted in the control chamber to connect various of said passageways with each other through the control chamber, and means on said core controlling said unbalanced valve to selectively allow and check fluid flow between the control chamber and operating chamber.

11. A valve comprising a casing defining an elongated control chamber, said control chamber having a plurality of ports communicating therewith at spaced points along the length thereof, a core slidable in said chamber having a dividing wall extending axially thereof, said wall having the longitudinal edges thereof in slidable engagement with the chamber wall, a solid end disk on said core engaging the chamber wall around the periphery thereof, masking portions extending at spaced intervals from said dividing wall into slidable engagement with said chamber wall adapted to selectively close or open said ports to the control chamber when the core is moved to respectively position them over or displaced from said ports, said dividing wall, end disk, and masking portions defining compartments in the chamber adapted to place various of the ports in registration, and said end disk having a bleeder passageway therethrough joining at least one of said compartments with a closed end of the chamber beyond the core to bleed fluid through the disk for equalizing pressures on both sides thereof to balance fluid end thrusts on the core.

12. A valve comprising a casing defining an elongated control chamber, said chamber having an inlet port, an outlet port, and an operating port communicating with said chamber at spaced apart areas thereof, a core slidable in said casing having spaced apart masking portions in slidable engagement with the chamber walls adapted to close said ports when the core is moved to position them over the ports, said core defining compartments between the masking portions for placing various of the ports in communication, a solid end portion on said core slidable engaging the chamber wall around its periphery, one face of the solid end portion defining an end wall for the compartments adapted to communicate with the inlet and outlet ports, the opposite face of said end portion facing a closed end of the chamber, and said solid end having a bleeder passageway therethrough joining the opposite faces thereof whereby fluid is free to flow between the compartments and said closed end of the chamber to relieve end thrusts on the core and maintain the set positions thereof.

13. A valve mechanism comprising a casing defining a control chamber having a plurality of ports along the length thereof communicating with said chamber, a core slidable in said casing having recessed portions along the length thereof adapted to place various of said ports in communication, said core also having masking portions in slidable engagement with the chamber wall to close said ports when positioned opposite said ports, a solid end wall on said core engaging the chamber wall around substantially the entire periphery thereof, said end wall having one face thereof defining an end of at least one recessed portion of the core and having an opposite face thereof defining the inner end of a blind compartment in the control chamber, and said solid end wall of the core having a passageway therethrough joining the recessed portion with the blind compartment whereby fluid is free to flow between the recessed portion and the compartment to equalize pressures on both sides of the end wall and balance end thrusts on the core.

HARRY C. BUFFINGTON.